(12) United States Patent
Oblizajek et al.

(10) Patent No.: US 11,326,664 B2
(45) Date of Patent: May 10, 2022

(54) CONTROL OF REAL-TIME DAMPER IN A SPRUNG MASS SYSTEM

(71) Applicant: GM Global Technology Operations LLC, Detroit, MI (US)

(72) Inventors: Kenneth L. Oblizajek, Troy, MI (US); Larry G. Gepfrey, Fenton, MI (US); John D. Sopoci, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 16/434,372

(22) Filed: Jun. 7, 2019

(65) Prior Publication Data
US 2020/0386292 A1    Dec. 10, 2020

(51) Int. Cl.
| | |
|---|---|
| *F16F 9/53* | (2006.01) |
| *F16F 9/512* | (2006.01) |
| *B60G 15/06* | (2006.01) |
| *B60G 11/15* | (2006.01) |

(52) U.S. Cl.
CPC .............. *F16F 9/535* (2013.01); *F16F 9/512* (2013.01); *B60G 11/15* (2013.01); *B60G 15/063* (2013.01); *B60G 15/068* (2013.01)

(58) Field of Classification Search
CPC .... F16F 9/53; F16F 9/532; F16F 9/535; F16F 9/512; F16F 9/5123; F16F 15/00; F16F 15/002; F16F 15/005; F16F 15/02; F16F 15/03; B60G 11/15
See application file for complete search history.

(56) References Cited

U.S. PATENT DOCUMENTS

| | | | |
|---|---|---|---|
| 7,963,377 B2 | 6/2011 | Quinn et al. | |
| 8,327,984 B2 | 12/2012 | Foister et al. | |
| 8,490,762 B2 | 7/2013 | Lopez, Jr. et al. | |
| 8,744,682 B2 | 6/2014 | Oblizajek et al. | |
| 2004/0215380 A1* | 10/2004 | Song ...................... | B60G 17/08 701/37 |
| 2006/0225979 A1* | 10/2006 | Quinn ..................... | F16F 9/512 188/322.21 |
| 2016/0202112 A1* | 7/2016 | Kubota ................... | F16F 15/02 73/649 |

* cited by examiner

*Primary Examiner* — Vishal R Sahni
(74) *Attorney, Agent, or Firm* — Quinn IP Law

(57) ABSTRACT

A method for reshaping an electric drive signal of a real-time damper in a sprung mass system includes detecting a periodic frequency and magnitude of a target periodic vibration of a sprung mass. The periodic vibration has velocity and elasticity components that are 90 degrees out-of-phase. An electric drive signal to the real-time damper is reshaped by a controller depending on polarity of the velocity component to thereby generate a composite drive signal. The damper is energized using the composite drive signal to modify a damper force. Reshaping the electric drive signal includes injecting a force and/or an intermittent drive suppression component onto the electric drive signal based on the frequency and magnitude. The sprung mass system may have a frame and body, motion and wheel speed sensors, the real-time dampers, road wheels, and a controller programmed to perform the method.

20 Claims, 6 Drawing Sheets

CONTROL OF REAL-TIME DAMPER IN A SPRUNG MASS SYSTEM

INTRODUCTION

The present disclosure relates to methods and systems for reducing vibration in a rolling platform having sprung and unsprung masses, with the latter including real-time dampers disposed at the corners of the rolling platform. The sprung mass of such a rolling platform, exemplified herein as a motor vehicle, generally encompasses a frame and a body, or alternatively a unibody construction in which the frame and body are integrally formed. A suspension system connects the sprung mass to drive axles and a set of road wheels, with components of the suspension system, the drive axles, and the road wheels collectively forming the unsprung mass. As a rolling platform of this type travels along a road surface, tires disposed on the road wheels periodically contact bumps, cracks, potholes, or other surface imperfections. The suspension system is typically configured with coil springs and corner dampers to absorb energy resulting from such contact. Together, the springs and dampers help prevent the transfer of energy into the sprung mass while maintaining rolling contact between the tires and the road surface.

The real-time dampers controlled using the disclosed methodologies are a particular type of passive damper employing sliding damper rods within an outer damper housing. While coil springs compress to absorb vibration energy, the damper rods of a real-time damper accommodate vertical motion in a different manner. Typically, the damper rods translate in a telescoping manner within the damper housing. Unlike actively-controlled dampers employing powered actuators that input energy into the suspension system, a real-time damper instead removes energy from the suspension system by changing the sliding resistance presented to the translating damper rods within the damper housing. Such a change is typically initiated by an electrical drive current to drive coils of the real-time dampers.

SUMMARY

The present disclosure pertains to force control of one or more real-time dampers within a sprung mass system, such as but not limited to a motor vehicle, robot, or other rolling platform having a suspension system connecting a sprung mass to a set of road wheels. It is recognized herein that the performance of a real-time damper may be suboptimal when handling certain low-level periodic vibrations. For example, corner excitations may result from the rotation of road wheels on a smooth road surface, which tends to maximize periodic vibrations at integer multiples of rotational speeds proximate the resonant frequency of the suspension system. Such corner excitations may produce periodic vertical body/chassis motion at intermediate frequencies of about 10-20 Hz for nominal roadway usage. Motion at such frequencies may result in small (sub-millimeter) displacements of the damper rods within the real-time dampers.

For a damper rod to begin to slide within the damper housing, the damper rod must first overcome frictional forces between the sliding damper rod and internal seals of the damper cylinder and housing. As the damper rod initiates relative motion along the damper cylinder, stiction properties define the resisting forces and influence the related damper rod motion. Due to the resulting friction and stiction properties, the damper rods tend to intermittently and partially cease or bind within the damper housing. The friction and stiction collectively produce force contributions that depart from those of an ideal damper, with an ideal damper producing forces exclusively through velocity-dependent relationships. Noise, vibration, and harshness effects perceived by an operator or passenger of the rolling platform may be exacerbated, with the present approach helping to address this undesirable result.

The present method is intended to address effects of the above-noted stiction problem in a rolling sprung mass system having real-time dampers disposed at corners of the sprung mass, e.g., a body and frame. The method operates by reshaping an electrical drive signal of the real-time damper to modify forces of each of the real-time dampers, which may be independently-achieved at each corner. Specifically, a controller induces a force component ("injected force component") through the electric drive signal at particular points of a corner vibration event. This process initiates near a change in the polarity of the velocity component of the periodic motion, i.e., during energy-absorbing modes of operation in appropriate quadrants of a four-quadrant phasor plane as described below. The injected force component is induced by a signal having a controlled narrow-frequency bandwidth that leads the velocity-prescribed force. When considering the net force generation at the periodic frequency of motion across the wavelength of the cycle, the injected force negates the adverse stiffness component from elastic origins. The adverse effects of such elastic force components on vibration transmissibility from the suspension to the vehicle body are described below, along with the opportunity to suppress the resulting excessive vibrations of the vehicle body.

In an example embodiment, a method for controlling force of a real-time damper in a sprung mass system includes detecting a periodic frequency and magnitude of a target periodic vibration of a sprung mass within the sprung mass system via a controller. The target periodic vibration has a velocity component of the damper force and an elasticity component of the damper force that are 90 degrees out-of-phase with respect to one another. The method includes reshaping an electric drive signal of the real-time damper based on the polarity of the damper velocity to thereby produce a composite drive signal, and then energizing the real-time damper using the composite drive signal to thereby modify the force of the real-time damper. Reshaping of the electric drive signal may include introducing an injected perturbation component and/or an intermittent drive suppression onto the electric drive signal based on the periodic frequency and the periodic magnitude of the target periodic vibration. Projection of the injected force component is 180 degrees out-of-phase with the elasticity component of the target periodic vibration.

Detecting the periodic frequency of the target periodic vibration may include receiving a pulse train signal and/or compacted information arising from a rotary speed sensor of the sprung mass system, and then calculating the periodic frequency using the pulse train signal and/or the compacted information.

The sprung mass may include a frame and a body of a motor vehicle having a road wheel. The rotary speed sensor in such an embodiment may be a wheel speed sensor connected to the road wheel.

Detecting the periodic magnitude of the target periodic vibration may include measuring a displacement of the real-time damper over time using a displacement sensor, and then calculating the periodic magnitude using the displacement of the unsprung mass as measured by the displacement sensor.

Detecting the periodic magnitude of the target periodic vibration may include measuring an acceleration of the real-time damper using an accelerometer, and then calculating the periodic magnitude using the acceleration of the unsprung mass as measured by the acceleration sensor.

Reshaping the electric drive signal may include estimating a desired drive signal based on the periodic frequency, the phase of the target periodic vibration, and a predetermined dynamic characterization of the real-time damper. The controller may be programmed with a lookup table containing the predetermined dynamic characterization, with the method including extracting the electric drive signal from the lookup table based on the periodic frequency.

Energizing the real-time damper using the reshaped drive signal may include generating a magnetic field or an electric field with respect to the real-time damper to modify the force of the real-time damper.

The method may include electively disabling the reshaping of the electric drive signal in response to a predetermined condition, e.g., receipt of an override signal by the controller.

Some embodiments of the method may include calculating a root mean square (rms) amplitude of a total vibration of the system, with the above-noted override signal possibly being automatically generated by the controller when a calibrated variance exists between the rms amplitude of the total vibration and the periodic magnitude of the target periodic vibration.

A sprung mass system is also disclosed herein having a frame connected to or integrally formed with a body, a plurality of motion sensors, a plurality of wheel speed sensors, a plurality of real-time dampers, road wheels, and a controller. The plurality of real-time dampers each have individually-controlled forces responsive to an electric drive signal, and each is disposed with respect to a corresponding corner of the frame and the body. A respective one of the motion sensors is connected to a respective one of the real-time dampers. The road wheels are independently sprung to a respective corner of the frame and the body via a respective one of the real-time dampers, and each wheel is connected to a respective one of the wheel speed sensors.

The controller is electrically connected to the real-time dampers and is in communication with the wheel speed sensors and the motion sensors. The controller is configured to execute the above-described method to reshape the electric drive signal and generate the composite drive signal. The controller ultimately energizes or commands energizing of the real-time damper using the composite drive signal in order to individually modify the force of each of the real-time dampers.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
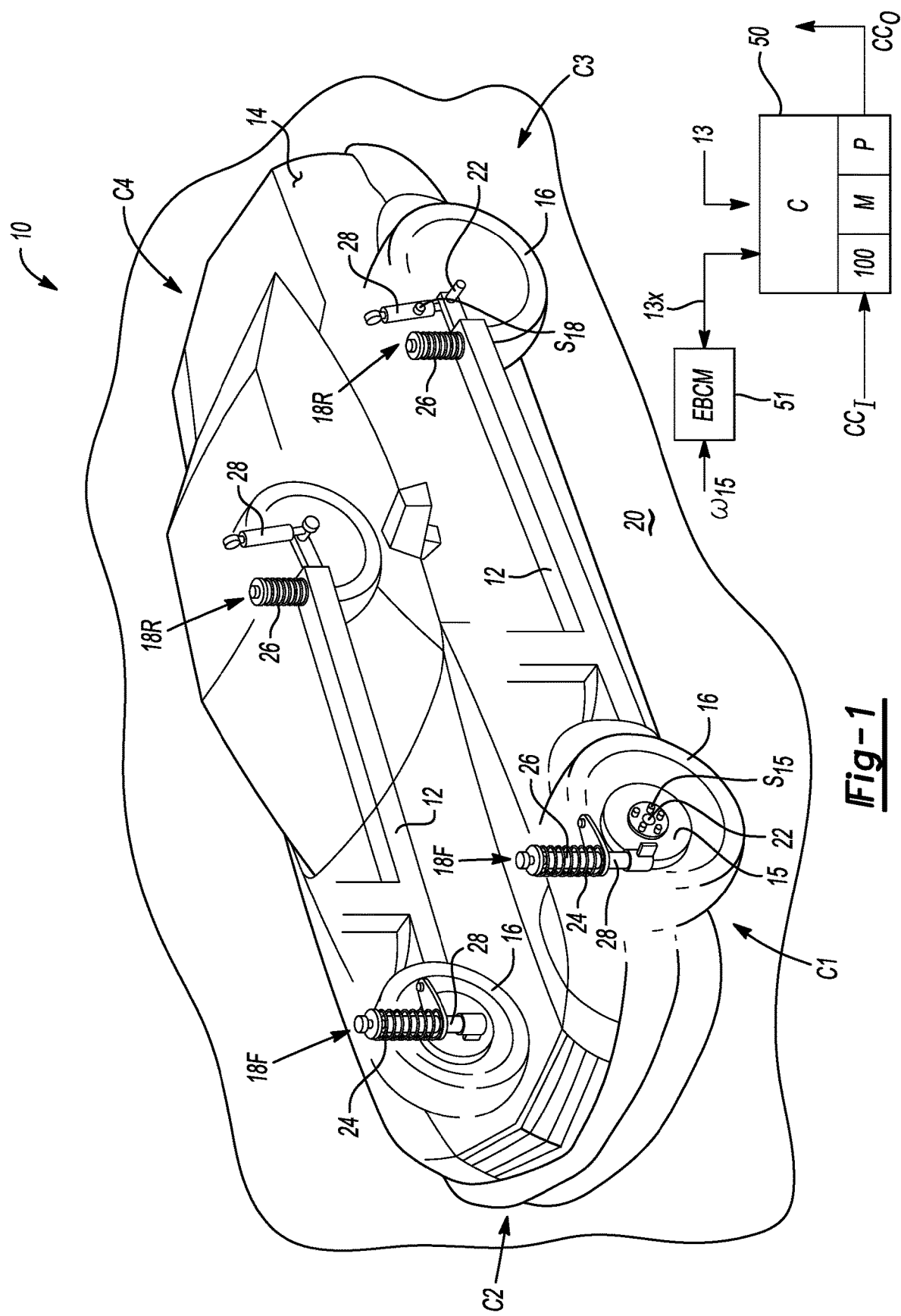
FIG. 1 is a schematic illustration of a rolling sprung mass system in the form of an exemplary motor vehicle with real-time corner dampers whose damping performance is adjusted according to the present disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a sprung mass system is depicted schematically in FIG. 1 and described below as a rolling platform 10 having front and rear suspension systems 18F and 18R, respectively. While depicted as a motor vehicle, other embodiments may be envisioned within the scope of the disclosure, including but not limited to robots, mobile platforms, construction equipment, or other systems having a sprung mass connected to or "sprung" to a set of road wheels 15 ($K_T$) via the suspension systems 18F and 18R. For simplicity, the rolling platform 10 will be referred to hereinafter as the motor vehicle 10 without limiting applications to such a motor vehicle 10.

With respect to the sprung mass, the motor vehicle 10 of FIG. 1 includes a chassis having frame ("chassis frame") 12, a body 14, and the road wheels 15. Each of the road wheels 15 includes a tire 16 that remains in rolling contact with a road surface 20. The chassis frame 12 and vehicle body 14 may be separate components as shown, or they may be integrally formed as a unibody construction. The chassis frame 12 has four corners C1, C2, C3, and C4, with the corners C1, C2, C3, and C4 corresponding to the locations of the road wheels 15 located at the front left, front right, rear left, and rear right of the chassis frame 12, respectively. Other configurations may have a different number of corners, e.g., a three-wheeled vehicle, and therefore the four-corner configuration is illustrative of the present teachings and non-limiting.

The chassis frame 12 and the vehicle body 14 are sprung to the road wheels 15 disposed at corners C1 and C2 by the suspension systems 18F, and to the road wheels 15 disposed at corners C3 and C4 by the suspension systems 18R. The road wheels 15 are attached to the suspension system 18F or 18R via axles 22. The suspension systems 18F may include a strut 24, e.g., a McPherson strut, having a coil spring 26 and a real-time damper 28 that cooperate with each other to control vertical motion of the motor vehicle 10 and the axles 22, and to help improve overall ride comfort for passengers of the motor vehicle 10. The rear suspension systems 18R may also include a coil spring 26, e.g., as a shock component, and a real-time damper 28, shown as separate members in FIG. 1. Alternatively, the front suspension 18F may include separate coil springs and dampers, e.g., in short-long arm (SLA) suspensions. Likewise, alternative rear suspensions 18R include integral coil spring and dampers configured as coil-over modules. Additional alternative spring members can vary, e.g., as leaf springs, torsion-bars, etc.

Use of a damper in such suspension configurations yields the same adverse dynamic conditions that are addressed by the solutions of the present disclosure. Furthermore, some configurations exacerbate the adverse dynamic actions of the damper due to the relative position of the damper in the suspension system and the relative reaction forces arising from the joined condition of the damper and coil spring as a module, e.g., the above-noted McPherson strut or coil-over modules. These exacerbated conditions are likewise relieved with the approaches detailed herein.

As shown in FIG. 1, the springs 26 and real-time dampers 28 form a parallel configuration characterized by vehicular body forces resulting from the sum of the respective spring and damper forces. The coil springs 26 will tend to compress and extend in response to vertical forces to permit movement of the road wheels 15 relative to the sprung mass, i.e., the chassis frame 12 and body 14. As noted above, the real-time dampers 28 are a particular type of passive damper that have the ability to continuously and virtually instantaneously ("real-time") change the flow resistance as the fluid passes from one chamber to another inside the damper 28. To that end, a controller (C) 50 may receive real-time measurements from rotary sensors ($S_{15}$), e.g., wheel speed sensors disposed on the individual road wheels 15, and motion sensors ($S_{18}$) such as displacement sensors or accelerometers disposed on the unsprung mass, i.e., the real-time dampers 28 and/or other portions of the suspension systems 18F and 18R. The controller 50 also receives signals from other systems in the vehicle 10, including but not limited to steering wheel angle, brake pedal position and accelerator pedal position, etc. As described below, a secondary controller 51, e.g., an electronic brake control module (EBCM) in an example embodiment, may be in communication with the controller 50 over a controller area network (CAN) bus or another low-voltage communications link via signals (arrow 13x) to provide parameters or data enabling calculation of values in the course of the present method 100, including wheel speeds, thus enabling periodic frequencies at intervals of time adequate for the bandwidth of concern.

Operation of the real-time dampers 28 may be regulated by the controller 50 in response to input signals (arrow $CC_I$), including readings from sensors ($S_{15}$) and sensors ($S_{18}$) and a possible manually-generated or automatically-generated override signal (arrow 13). An electric drive signal (arrow $CC_O$), possibly in modulated form as described below, is transmitted by the controller 50 to each of the real-time dampers 28, individually, over a two-wire conductor. That is, forces of the real-time dampers 28 may be individually modified by the controller 50 as part of method 100, with description applicable to one such real-time damper 28 being applicable to the remaining real-time dampers 28, albeit with possible variation in the corresponding damping states of the real-time dampers 28 at corners C1, C2, C3, and C4.

The controller 50 may include one or more processors (P) and tangible non-transitory memory (M), including read only memory in the form of optical, magnetic, or flash memory. Although omitted from FIG. 1 for illustrative clarity, the motor vehicle 10 is equipped with a power bus and/or an auxiliary power module in communication with the controller 50, or integral thereto, such that transmission of the electric drive signal (arrow $CC_O$) is a straightforward matter of connecting drive coils or other drive circuitry of the real-time dampers 28 to such a power bus or output of such an auxiliary power module. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry. Operation of the controller 50 in performing the method 100 is described in detail below with reference to FIGS. 5-7.

The real-time dampers 28 may be optionally embodied as field-controlled magnetorheological (MR), electrorheological (ER), or dynamically valve-controlled dampers. As will be appreciated, an MR damper includes ferrous particles suspended in an oil base fluid, which enables a continuously variable flow restriction to occur in the presence of a continuously-varying magnetic field. ER dampers operate in a similar manner using a suspension of conductive particles in a dielectric base fluid, and with the applied field being an electric field. Damping in a real-time MR or ER damper is largely a matter of timing the field generation and scaling the field. Other real-time dampers exist, with an example of this being a valve-based real-time hydraulic damper as noted above, that has the ability to vary the forces by controlling valve flow resistance responsive to input signals.

Figure 2:
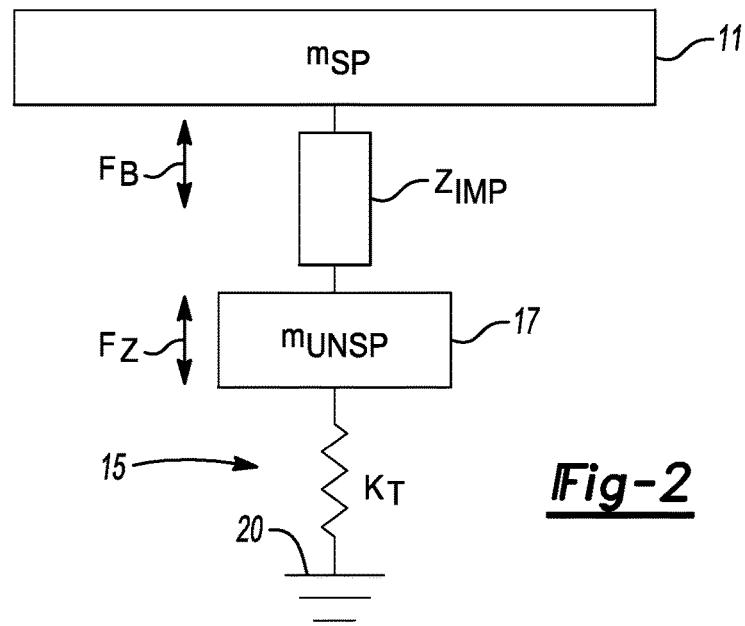
FIG. 2 is a schematic depiction of sprung and unsprung masses of the example motor vehicle shown in FIG. 1.

The targeted damping function affected by the present method 100 may be understood with brief reference to FIG. 2. Excitation forces (arrow $F_z$) from rolling contact of the tires 16 of FIG. 1 on the road surface 20, with subscript Z indicating the vertical direction in a typical XYZ coordinate system in which Z represents the vertical direction, are transferred vertically to the sprung mass ($m_{sp}$) 11 of the motor vehicle 10, i.e., the chassis frame 12 and body 14. At frequencies of concern, e.g., greater than about 8 hz, the sprung mass ($m_{sp}$) 11, being much larger than the unsprung mass ($m_{UNSP}$) 13, yields little motion relative to that of the unsprung mass ($m_{unsp}$) 13 responsive to the body force (arrow $F_B$). Therefore, the sprung mass 11 can be treated as a virtual ground for consideration of the suspension dynamics.

The unsprung mass ($m_{unsp}$) 13 is disposed between the tires 16 and the sprung mass ($m_{sp}$) 11. A goal of a properly designed suspension system 18F and 18R is to optimize the effective impedance ($Z_{IMP}$) between the sprung mass 11 and the unsprung mass 13 in order to minimize the portion of the excitation forces ($F_z$) ultimately transmitted to the sprung mass 11, i.e., the above-noted body force component (arrow $F_B$). With force transmissibility in the illustrated system defined as $F_B/F_z$, achievement of force transmissibility levels no larger than 1 may be considered to be ideal for the purposes of this disclosure. Maximum values of 1, however, even with an ideal damper are furthermore generally not achieved due to the presence of another member typically disposed between the real-time damper 28 and the chassis frame 12 or body.

This member, a virtually elastic top mount, introduces phase lag between force and velocity, and similar to the actions of friction and stiction in the damper, yields a maximum in transmissibility in slight excess of 1. This effect and its consequences are less significant than those of friction and stiction within the real-time damper 28, and thus will be ignored herein for purposes of simplified illustration and description. As an example, and with consideration of mounts and dampers generally used in suspension applications, this effect and its consequences produce phase lags of approximately 15-deg, which may be compared to 45-deg to 60-deg phase lags of the damper 28, when operated under the conditions explained above. These smaller effects, furthermore, can also be compensated by the methods described herein.

Figure 3:
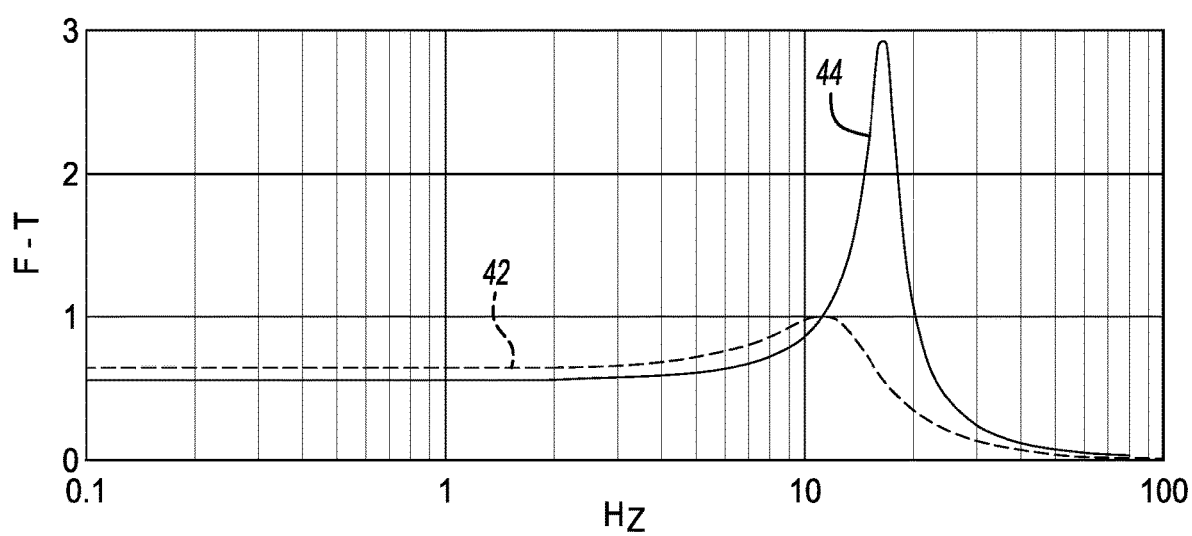
FIG. 3 is a plot of relative damping performance of a partially-seized real-time damper and an ideal damper, with force transmissibility depicted on the vertical axis and frequency depicted on the horizontal axis.

FIG. 3 depicts a plot 40 of relative damping performance of an ideal damper (trace 42) and a partially-seized real-time damper 28 (trace 44) in terms of force transmissibility (F-T) around targeted intermediate vibrational frequencies 10-20 Hz, i.e., the resonant frequency of a typical vehicular suspension system. Excitation at levels consistent with the properties yielding the representative response in FIG. 3 may occur due to rotation of the road wheels 15 of FIG. 1 as the motor vehicle 10 travels along a smooth stretch of the road surface 20.

In the case of an ideal damper, force transmissibility remains less than or equal to 1, i.e., $F_B \leq F_Z$ in the diagram of FIG. 2. However, stiction within the real-time dampers 28 reduces relative motion between the damper rod and body (not shown), alters the phase between the force and the velocity, and thus causes the real-time dampers 28 to partially seize under the very small stroke that occurs at the targeted intermediate frequencies, with "very small" generally referring to travel on the order of about 0.3 to 1 mm. The present approach is intended to eliminate the added adverse elasticity component of the real-time dampers 28 in the targeted frequency range, ideally causing the damping performance to approach that of the ideal damper whose performance is depicted as trace 42 in FIG. 3.

The present approach seeks to reduce the response at and proximate the peak in FIG. 3 by using the real-time damping (RTD) function of the real-time dampers 28. The goal is to generate a force trace that leads the velocity signal, thereby offsetting the elasticity force effects. This can be accomplished by either increasing the forces between the zero-velocity crossing and the peak (injected force) and/or reducing the force between the peak velocity and the zero-velocity crossing (attenuated force). Since the introduced changes in the control signals may affect the ride quality of the motor vehicle 10, the amounts of the intentional injected and attenuated forces should be selectable and configurable, including the option of asymmetric injection and attenuation between jounce motion (compression of damper ends) and rebound motion (extension of damper ends). The subsequent paragraphs provide a detailed description of the method.

Figure 4:
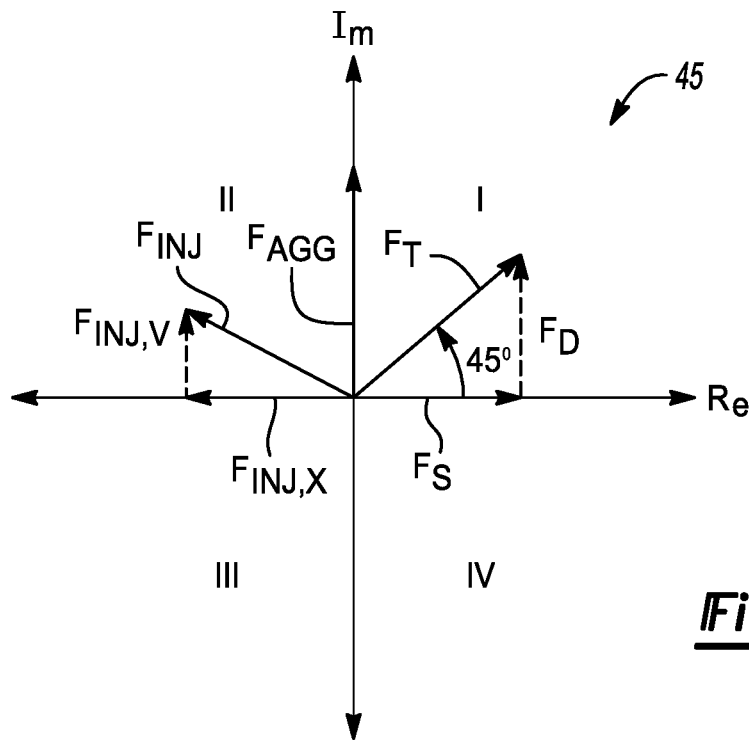
FIG. 4 is a schematic phasor plot in a four-quadrant complex plane and illustrating displacement, velocity, and force components of a representative periodic corner vibration aboard the motor vehicle shown in FIG. 1.

Referring to FIG. 4, the present problem and solution may also be understood with reference to a phasor plot 45 having four quadrants, i.e., quadrants I, II, III, and IV, in which periodic vibrational variables are depicted as vectors with magnitudes and phases relative to a reference. Vectors are defined as follows: $F_S$ and $F_D$ are the unperturbed elasticity and velocity components of the damper force, respectively. $F_T$ is the unperturbed summed vector of $F_S$ and $F_D$. $F_{INJ}$ is the injected force component, while $F_{INJ,x}$ and $F_{INJ,y}$ are the respective projections of $F_{INJ}$ along the real ($R_e$) and imaginary ($I_m$) axes of FIG. 4. Vector $F_{AGG}$ is the aggregated total force at 90°, and is the sum of $F_T$ and $F_{INJ}$. Shown in FIG. 5 are two other time traces, i.e., $F_{INJp}$ and $F_{INJn}$, which are the positive and negative perturbation force, respectively.

The unperturbed elasticity component of a damper force from the real-time damper 28 along the horizontal axis, i.e., vector $F_S$, arises as an elasticity component from an elasticity reaction as described herein. An unperturbed velocity component of the damper force along the vertical axis, i.e., vector $F_D$, corresponds to a velocity component, with the velocity component (vector $F_D$) leading at 90° out-of-phase relative to the elasticity component $F_S$. The unperturbed sum is thus depicted as vector $F_T$. Leading angles are plotted as counterclockwise positive angles in FIG. 4. Such polar plots are commonly used to display phasor quantities with a real axis (horizontal) and an imaginary axis (vertical), with the real axis abbreviated $R_e$ and the imaginary axis abbreviated $I_m$ for clarity. Components of phasors projected along the real axis are in phase with the reference phasor while components of phasors projected along the imaginary axis are 90 degrees out of phase with the reference. It is also common to use dynamic displacement as a reference phasor as displayed in FIG. 4.

An ideal damper lacks an elasticity component, and thus is comprised solely of the velocity component (vector $F_D$). However, for the reasons set forth above, the real-time dampers 28 described herein tend to amplify transmissibility of forces propagating through the suspension system 18F or 18R into the chassis frame 12 and body 14 of FIG. 1, and thus also have the elasticity component (vector $F_S$) that, when combined with the velocity component (vector $F_D$), exhibits the performance indicated by a summed vector $F_T$. While the summed vector $F_T$ is shown at 45° in FIG. 4 relative to the elasticity component (vector $F_S$) for illustrative simplicity, i.e., having equal velocity and elasticity contributions, the summed vector $F_T$ may vary anywhere from about 1° to about 89° in practice, and therefore 45° is illustrative of the present teachings and not limiting thereof.

Figure 5:
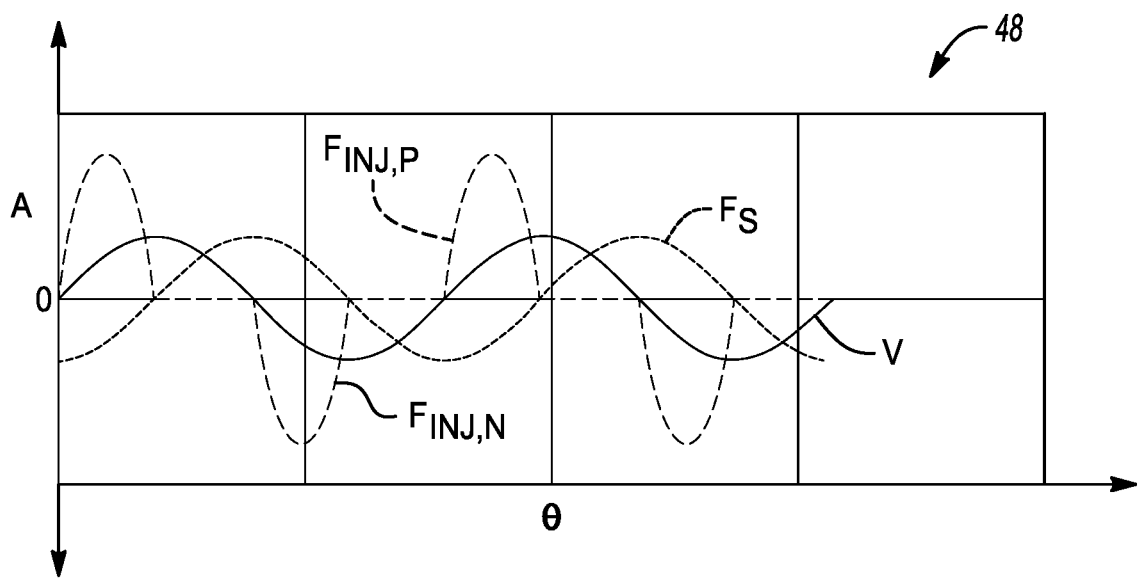
FIG. 5 is a plot of continuously-varying velocity and force components along a wheel rotation angle of the above-noted periodic corner vibration, along with an injected out-of-phase force component according to the present disclosure.

Referring to FIG. 5 and traces 48, a goal of the present approach is to selectively inject a projected force component, i.e., a projection of an injected force component along the horizontal axis that is 180° out-of-phase with respect to the elasticity component ($F_S$) when controlling the real-time dampers 28. The injected force component (vector $F_{INJ}$) having horizontal and vertical projections $F_{INJ,x}$ and $F_{INJ,y}$ in FIG. 4, leads the velocity component (vector V) by as much as possible, ideally 90°, so as to reduce the existing elasticity component (vector $F_S$). If sufficient in magnitude, the projection of $F_{INJ}$ along the horizontal axis, i.e., $F_{INJ,x}$, can completely offset the elasticity component (vector $F_S$) thereby yielding an aggregated total force (vector $F_{AGG}$) in phase with velocity (90-deg in FIG. 4). The aggregated total force (vector $F_{AGG}$) is the vector sum of the summed vector (vector $F_T$ of FIG. 4) and the injected force component $F_{INJ}$.

Since the real-time damper 28 is a controlled passive damper and not an active damper, the real-time damper 28 is not able to operate in quadrants III or IV of FIG. 4, which are the active control regimes. Thus, while a lead of 90° is targeted, the injected force component (vector $F_{INJ}$) can practically lead the velocity component by a value of less than 90 deg, or about 60-80°. Furthermore, if a desired amount of ideal damping force is less than that of the aggregated total force (vector $F_{AGG}$), the desired amount of ideal damping force can be accomplished by reduction of the originally mapped force-velocity relationship for the unperturbed relationships. This, furthermore, is achieved by a reduction in the original control signal by an amount compatible with the desired aggregated total force (vector $F_{AGG}$).

Figure 6A:
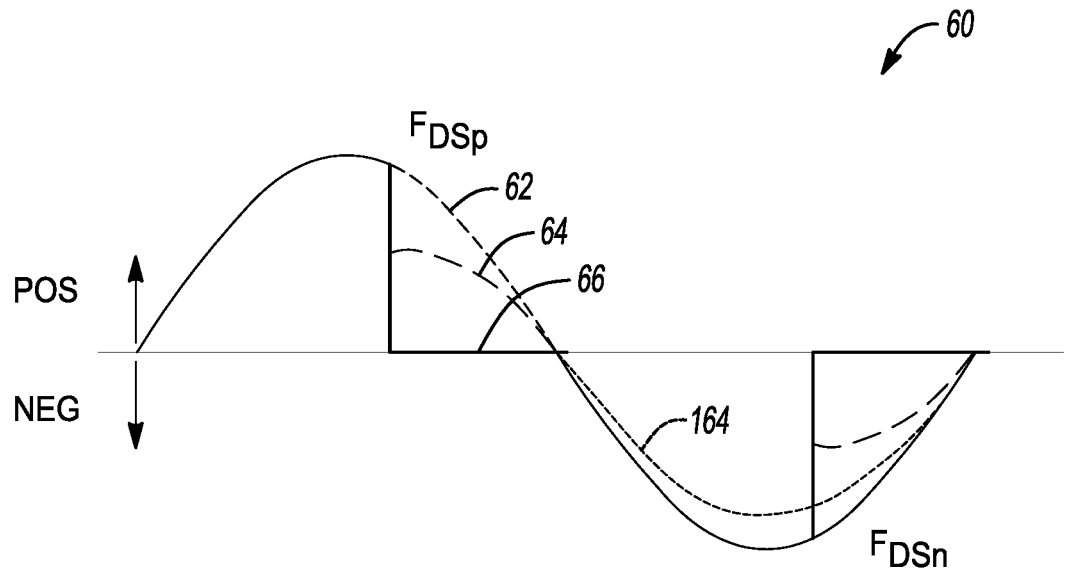
FIGS. 6A-6C are time plots of positive and negative force components describing unshaped, partial suppression, and complete suppression and injected treatments of the above-noted periodic corner vibration.

In cases where the original control signal simultaneously affects the elasticity component (vector $F_S$), this can likewise be accommodated in achieving the desired aggregated total force (vector $F_{AGG}$). In addition to the introduction of perturbations, another treatment termed "intermittent drive suppression" includes diminishing the unperturbed force signal at selected time intervals, an example of which is shown in FIG. 6A. Trace $F_{DSp}$ is formed by suppression of the force while the force polarity is positive and before the subsequent zero-crossing. $F_{DSn}$ is formed by suppression of the force while the force polarity is negative and before the subsequent zero-crossing.

Shown in FIG. 6A as a non-limiting example set of traces 60, either partial (trace 64) or total (trace 66) suppression is possible relative to an unsuppressed level (trace 62). Partial suppression (trace 64) may be obtained by proportional reduction of the underlying sinewave with a constant, as shown in FIG. 6A, or varying proportionality factor (not shown) dependent on position along the wavelength. Complete suppression (trace 66) can be achieved by reducing the force to zero in these regions. Selected shapes are shown as non-limiting examples in FIG. 6A. Furthermore, perturbations and drive suppressions can be applied simultaneously since each action can occur at different time intervals over the wavelength of the applied force and each action will incrementally increase the lead angle. The net result of these actions yields a reshaped signal producing the desired aggregated total force (vector $F_{AGG}$ of FIG. 4).

As an asymmetric drive treatment option, trace 64 may be modified using different positive- or negative-going values, shapes of the positive- versus negative-going values, scaled shapes, different starting points of the negative and positive signals, etc. Trace 164 is a non-limiting illustrative example of such asymmetric drive treatment, with the area under trace 64 greater than the area under trace 164 (i.e., negative portion of trace) in this particular variation.

Figure 6B:
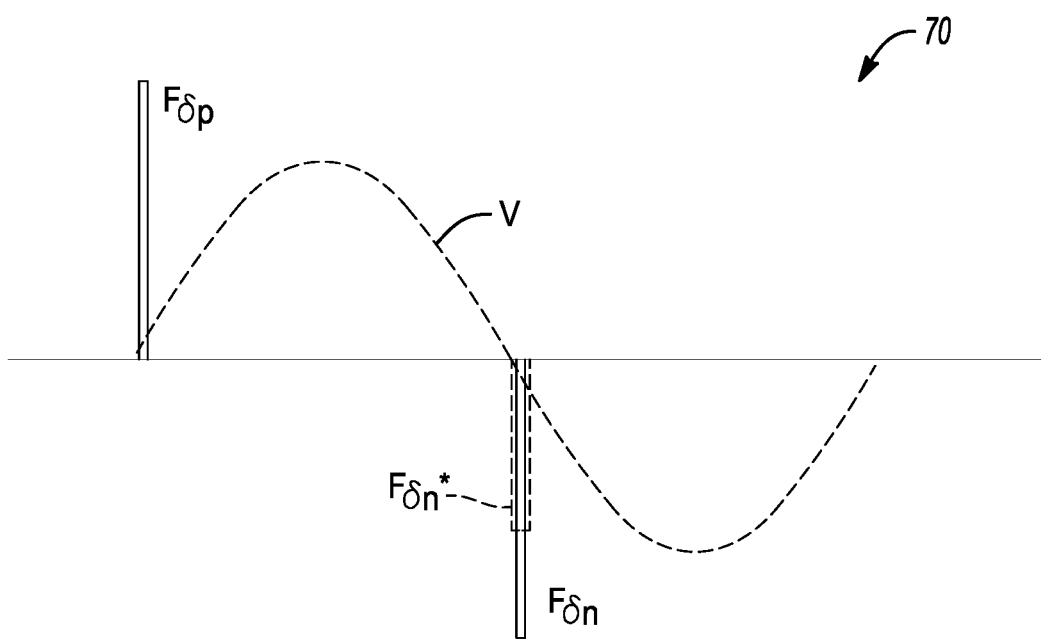

An example of an extreme representation of a superimposed effect of a combined perturbation and intermittent drive suppression is shown in FIG. 6B. The waveshape 70 of FIG. 6B is constructed by two Dirac-delta functions of opposite polarity at the zero-crossings of the velocity (trace V), a positive drive $F_{\delta p}$ and a negative drive, $F_{\delta n}$. When an asymmetric drive treatment option is used, the negative drive, $F_{\delta n}$, may be different from that of the positive drive $F_{\delta p}$, an example of which is shown by $F_{\delta n}*$, indicating a quantitatively smaller negative influence. Alternatively, the positive influence may be smaller than that of the negative influence. Furthermore, although depicted in FIG. 6B as a reduction in strength for illustration only, a more conventional mathematical representation involves bounded intensity disparities of impulses, i.e., areas of unbounded strengths over infinitesimal time intervals. These mathematical considerations yield ideal lead angles asymptomatically approaching 90 degrees as the infinitesimal time intervals approach zero. Such conditions are not practically achievable due to the dynamic response characteristics of the real-time damper 28. FIG. 6B is provided as an example of an ideal condition producing 90-deg lead (ref: velocity) thereby capable of offsetting the elasticity contribution with appropriate scaling. The injection of a perturbation and a drive suppression, although under-achieving in providing a 90-deg lead like that of the pair of scaled Dirac-delta functions, instead achieves results that are practically manageable and effective.

Figure 6C:
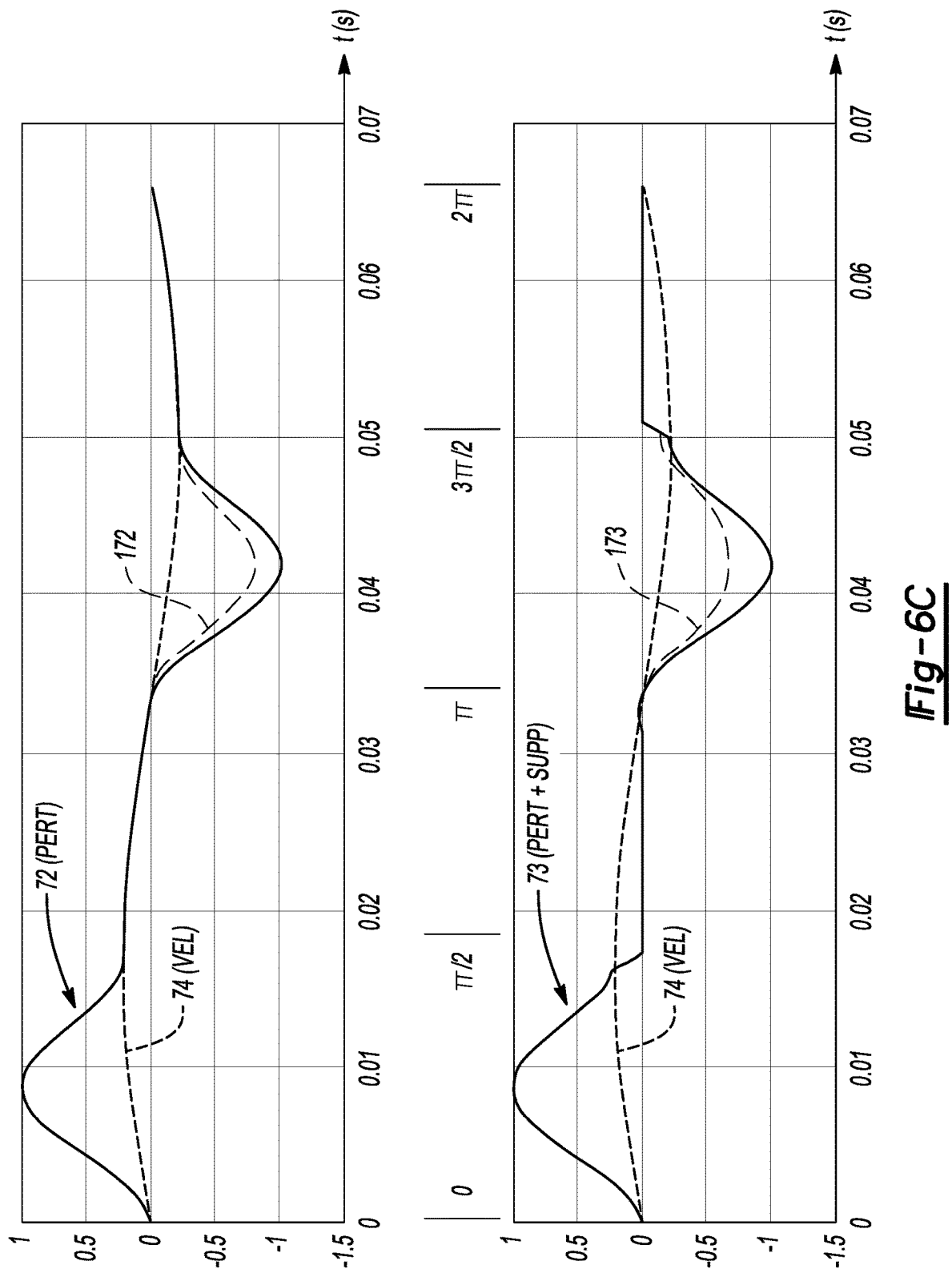
Figure 6D:
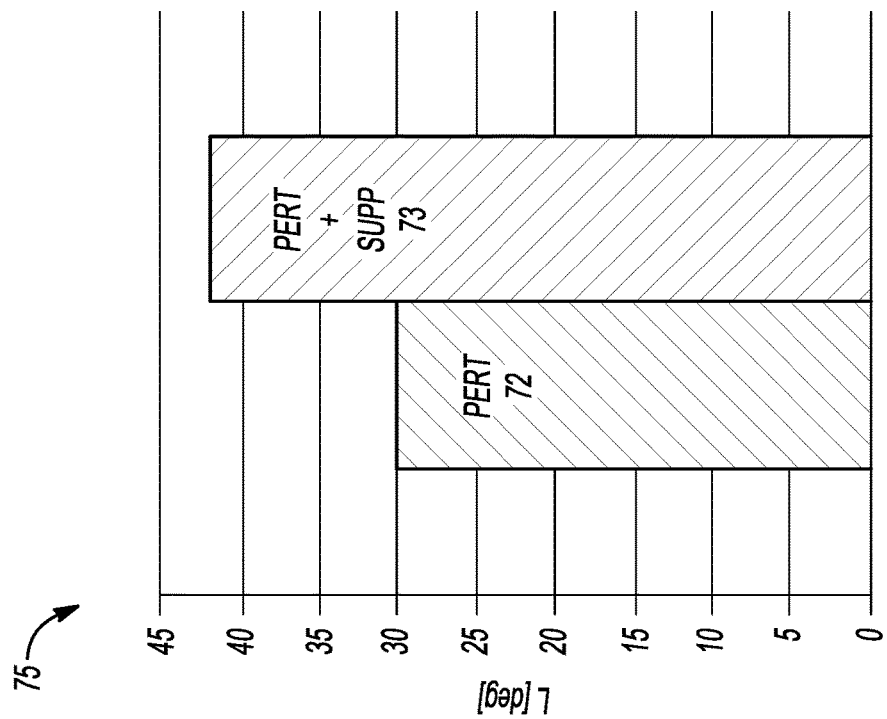
FIG. 6D is a graphical depiction of the representative treatments shown in FIG. 6C.

A practical implementation, therefore, may appear as depicted in FIG. 6C, where trace 74 shown in the upper chart of FIG. 6C is a normalized damper velocity (VEL) and the solid trace 72 represents the normalized force perturbation treatment (PERT). Trace 172 illustrates the above-noted non-limiting example asymmetric drive treatment where the positive side (trace 72) is larger than the negative side (172). As noted above, other asymmetric drive treatments may be used within the scope of the disclosure. The lower chart of FIG. 6C shows the combined force perturbation and force suppression treatment (PERT+SUPP) as solid trace 73 (or trace 173 for asymmetric drive treatment), with the normalized damper velocity again shown as trace 74. The charts of FIG. 6C together display variables plotted versus time (t) in seconds (s) for a nominal and arbitrarily chosen periodic vibration at 15 hz. Time and location along one full period of the vibration are both plotted along the horizontal axis. In this example, a lead angle of 30-degrees is achieved via the perturbation in the upper chart of FIG. 6C. Although the positive and negative force treatments in FIG. 6C display mirrored symmetry, in general, the shapes, excursions and application intervals may be different for positive vs negative treatments. An additional 12-degrees is obtained with a suppression treatment, resulting in a combined lead angle of 42-degrees as depicted in FIG. 6C. The relative treatment (TRT) corresponding to the above-noted lead angles (L) of traces 72 and 73 in FIG. 6C is depicted in FIG. 6D as a bar graph 75.

Accommodation for the dynamic response of the real-time damper 28 while attempting to achieve a desirable phase lead (ref: velocity) can yield substantial improvements in the properties of the real-time damper 28. Additional explanations of similar desirable incremental effects of the drive suppressions are omitted for brevity herein, since such effects are readily appreciated as complementary effects achievable through signal depletion instead of signal enhancement via perturbations. It is also recognized herein that the disclosed methods produce force contributions at higher orders of the targeted periodic excitation, and may thereby limit aggressive application. Unwanted vibrations or sound may arise at the higher orders of the targeted periodic excitation with aggressive applications and may warrant amelioration.

Figure 7:
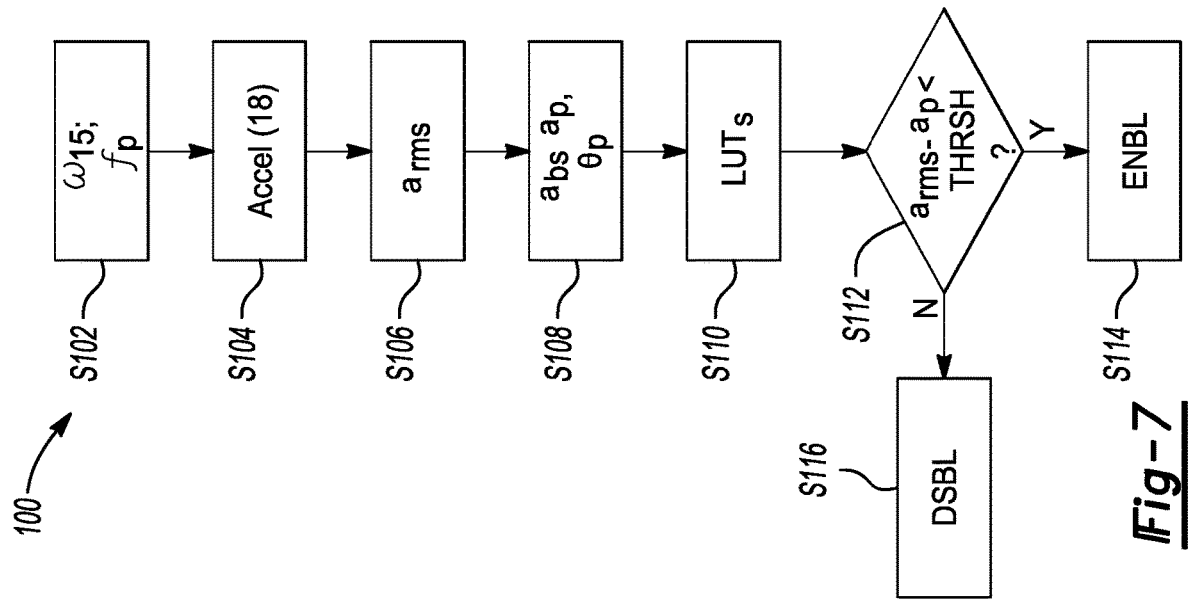
FIG. 7 is a flow chart describing an example method for controlling the resistance of a real-time damper aboard the motor vehicle shown in FIG. 1.

Referring to FIG. 7, a method 100 is executable by or with assistance of the controller 50 to affect the disclosed control of the real-time damper 28. The method 100 ultimately results in a reshaping of an electric drive signal to the real-time damper 28 based on polarity of the described velocity component, which thereby produces a composite drive signal. The real-time damper 28 is then energized using the composite drive signal to modify force of the real-time damper 28. Reshaping the electric drive signal includes introducing at least one of an injected perturbation component and an intermittent drive suppression onto the electric drive signal based on the periodic frequency and periodic magnitude of the target periodic vibration, with the projection of the injected force component being 180 degrees out-of-phase with the elasticity component of the target periodic vibration.

As described below, the method 100 includes detecting a periodic frequency and periodic magnitude of a target periodic vibration of a sprung mass within a sprung mass system, e.g., the frame 12 and body 14 of the motor vehicle 10 shown in FIG. 1. The target periodic vibration has a velocity component and an elasticity component that are 90 degrees out-of-phase with respect to one another as noted above. As described above with reference to FIG. 4, the targeted periodic vibration results from damper properties having an unperturbed velocity component of force (vector $F_D$) and an unperturbed elasticity component (vector $F_S$) that are 90 degrees out of phase with respect to one another.

When the velocity (V of FIG. 5) is positive and during a prescribed interval of time, the controller 50 superimposes a positive perturbation and applies drive suppression on the electric drive signal of the real-time damper 28 to produce a composite drive signal, and then energizes the real-time damper 28 using the composite drive signal, i.e., the electrical signal needed to achieve the desired force responses, such as the vector $F_{AGG}$ shown FIG. 4, accommodating the frequency response of the real-time damper 28 and its velocity. When the polarity of the velocity component (V of FIG. 5) is negative and during a prescribed interval of time, the controller 50 superimposes a negative perturbation and applies drive suppression on the electric drive signal of the real-time damper 28 to produce a composite drive signal, and then energizes the real-time damper 28 using the composite drive signal.

In some cases, the polarity of the drive signal is inconsequential in yielding the desired polarity of the resultant force. As an example, in MR applications the polarity of the controlled magnetic field can be single polarity. In these cases, and if the underlying drive properties are exclusively single polarity, then the composite drive waveshapes yielding the desired forces of FIG. 5 will be rectified before application to the real-time damper 28. Rectification refers to changing the polarity of one or the other positive or negative signals so that the modified signal has a single polarity, i.e., all positive-going or all negative-going without ever crossing a value of zero. The damping properties of the real-time damper 28 are thus modified. As described above, this reshaping process introduces an injected force component into the electric drive signal based on the periodic frequency and periodic magnitude of the target periodic vibration, with the projection of the injected force component shown as vector $F_{INJx}$ in FIG. 4 at 180 degrees out-of-phase with the elasticity component (vector $F_S$) of the targeted periodic vibration.

An example embodiment of the method 100 commences with step S102 with detection of the periodic frequency of the target vibration within the sprung mass system. The controller 50 of FIG. 1 may receive at least one of a pulse train signal and compacted information from or arising from a rotary speed sensor, e.g., the sensors $S_{15}$, with the controller 50 calculating a wheel speed ($\omega_{15}$) and periodic frequency ($f_p$) of the road wheel 15. Speeds and frequencies may be slightly different at the corners, and therefore the method 100 may be performed at each corner individually. As will be appreciated, the controller 50 may communicate with the secondary controller 51 of FIG. 1, which interfaces with the individual wheel speed sensors ($S_{15}$). The secondary controller 51, which may be an electronic brake control module (EBCM) in an example embodiment, provides a transformed communication signal over a controller area network (CAN) bus or another low-voltage communications link. The transformed communication signal contains the required parameters enabling calculation of wheel speeds, and therefore periodic frequencies at intervals of time adequate for the bandwidth of concern.

The wheel speed sensors ($S_{15}$) shown schematically in FIG. 1 typically output a pulse train signal, e.g., a square pulse train directly communicated via dedicated wiring to the secondary controller 51. The information of the pulse train is compacted and intermittently transmitted on the CAN by the secondary controller 51. When received by controller 50, the information of the pulse train is interpreted to construct a wheel speed $\omega_{15}$ and frequency $f_p$. The actual rotational speed and periodic frequency of the road wheels 15 is thus available to the controller 50 as part of the normal operation of controller 50. The method 100 then proceeds to step S104.

Step S104 includes measuring or otherwise determining the periodic magnitude of the motion of the unsprung mass, e.g., the suspension system 18F and 18R of the chassis frame 12 ("Accel(18)") connected thereto or of the real-time dampers 28. As part of this step, the controller 50 may receive input signals from the individual motion sensors ($S_{18}$) shown in FIG. 1, e.g., accelerometers, displacement or velocity sensors which directly measure the motion of the unsprung mass whose time-spaced measurements may be used to calculate the periodic magnitude of the motion at the targeted periodic frequency. Such information may be filtered, for instance using a band-pass filter, with the filtered values possibly used later in the method 100 at step S108. The method 100 proceeds to step S106.

At step S106, the controller 50 may calculate the root mean square (rms) value of the total acceleration (vibration) from step S104, i.e., $a_{rms}$, before proceeding to step S108. The rms value of the total acceleration may include unfiltered or filtered acceleration.

Step S108 may entail calculating the periodic magnitude and phase of the targeted corner vibrations at or near the periodic frequency ($f_p$) determined at step S102. Various mathematical approaches may be used for this step as will be appreciated by those of ordinary skill in the art. For instance, the rotational wheel speed ($\omega_{15}$) from step S102 may be integrated to derive a wheel angle used in a constructed sine/cosine pair, termed a co-quad pair. The sine value of such angular information and the filtered motion information from step S102 may be processed together, e.g., via a mixer, and thereafter integrated and normalized for the integration time. The same mathematical approach may be applied to the cosine value and filtered motion information. The output of the integrators used for the respective sine and cosine mixing processes thereafter may be used to calculate the periodic magnitude and phase of the periodic vertical motion phasor, $a_p$, i.e., abs($-a_p$) and $\theta_p$, respectively, where $\theta_p$=arg ($a_p$). The method 100 then proceeds to step S110.

At step S110, the controller 50 may access pre-populated lookup tables (LUTs) in its memory (M) and extract predetermined dynamic characterization of the real-time dampers 28, i.e., a response of the real-time dampers 28 for the periodic frequency ($f_p$) and phase ($\theta_p$) derived in step S108. Data stored in such LUTs may be determined offline for the specific type of real-time damper 28 used in the suspension systems 18F and 18R, and possibly indexed for different operating conditions such as magnitude of motion and temperature. The LUTs therefore may be populated with the predetermined dynamic characterization of the real-time damper 28, including data describing how the real-time damper 28 is likely to respond to a given drive signal at particular periodic frequencies and magnitudes of motion. The method 100 then proceeds to step S112.

At step S112, the controller 50 may optionally compare the rms amplitude ($a_{rms}$) from step S106 to the periodic magnitude of the periodic vibration abs($a_p$) determined at step S108, with the calibrated variance between the rms amplitude ($a_{rms}$) and the periodic magnitude of the periodic vibration abs($a_p$) being a predetermined disabling condition in a possible embodiment. The method 100 proceeds to step S114 when the rms value ($a_{rms}$) is less than the absolute value ($a_p$) by an amount equal to a predetermined threshold value (THRSH), and to step S116 in the alternative when the rms value ($a_{rms}$) exceeds the absolute value ($a_p$) by an amount greater than the threshold value.

Step S114 includes enabling (ENBL) composite control of the real-time damper 28 in response to the corner vibrations at the targeted intermediate frequency range. For the present oscillation frequency and phase, for instance, and when the velocity component (V) shown in FIG. 5 is positive, the controller 50 may extract the corresponding positive drive current information from the LUTs described in step S110. And, for the present oscillation frequency and phase, for instance, when the velocity component (V) shown in FIG. 5 is negative, the controller 50 may extract the corresponding negative drive current information from the LUTs described in step S110.

The controller 50 reshapes the electrical drive signal to the real-time damper 28 being controlled, doing so based on the polarity of the velocity component as noted above, which serves to generate a composite drive signal. The controller 50 may then apply the composite drive signal as an electric current to windings or coils of the real-time damper 28, which serves to inject the controlled force components (traces $F_{INJp}$ & $F_{INJn}$ shown in FIG. 5) in a manner that modifies the force of the real-time damper 28, i.e., opposes, reduces, or cancels out the elasticity component (trace $F_S$) at the selected frequencies. Reshaping of the electric drive signal in this manner includes introducing at least one of an injected perturbation component and an intermittent drive suppression onto the electric drive signal based on the periodic frequency and periodic magnitude of the target periodic vibration. Depending on the construction of the real-time damper 28, receipt of such a composite (reshaped) drive current by the real-time damper 28 will have a particular effect, e.g., increasing or decreasing the field strength of an MR or ER damper, which in turn will affect the damping performance. The method 100 is complete after step S114, with the method 100 resuming with step S102 in a loop.

Step S116 includes disabling (DSBL) reshaping control of the drive signal for real-time damper 28 in response to the predetermined condition of step S112, which in turn may trigger generation of the override signal (arrow 13 of FIG. 1) by and/or to the controller 50. That is, step S116 occurs in response to the determination at step S112 that the rms amplitude ($a_{rms}$) exceeds the absolute value of the periodic magnitude ($a_p$) of periodic motion by an amount larger than the threshold, which in turn may indicate travel on a rough road surface 20 (see FIG. 1). Temporarily disabling execution of the method 100 under such travel conditions prevents the damping control strategy disclosed herein from interfering with normal larger stroke operation of the real-time damper 28. That is, under certain operating conditions, such as when the road surface 20 of FIG. 1 is particularly bumpy, it may be advantageous to temporarily disable the disclosed functionality.

The method 100 may be selectively implemented in some embodiments, in other words, such as by manual disabling via selection of a touch-screen input or depression of a button on a center stack (not shown) to generate the override signal (arrow 13) of FIG. 1. Other optional disabling can include communications from other controllers via a disable/enable binary signal communicated to controller 50 either directly or through the CAN. As noted below, disabling may also alternatively or concurrently be achieved via a user-selectable option, with steps S112, S114, and S116 therefore being optional. That is, the controller 50 may automatically generate the override signal (arrow 13) in response to a predetermined condition such as the above-described $a_{rms}/a_p$ comparison. The method 100 is complete after step S116, with the method 100 resuming with step S102 in a loop as noted above.

Implementation of the method 100 described above thus entails extracting information describing periodic motion of the chassis frame 12/suspension systems 18F and 18R at the targeted frequencies of concern, which may be the periodic motion of the suspension systems 18F and/or 18R at the rotational speed of the road wheels 15. By varying the drive current to the real-time damper 28 at the specific points shown in FIG. 5, the controller 50 is able to cause a given real-time damper 28 to produce more or less force at specific time intervals for a given dynamic condition of the chassis frame 12. Since the conditions of each real-time damper 28 and the rotation speed of the road wheel 15 may be independent of that of each of the other real-time dampers 28 and road wheels 15, the method 100 may be applied individually and selectively at each of the corners C1, C2, C3, and C4. While the present teachings may be of particular benefit when addressing periodic excitation from tires 16 and road wheels 15, which may be amplified by friction and stiction within the real-time damper 28 to thereby produce undesirable corner vibration when traveling on a smooth road surface 20, the disclosure may be adapted for use in other applications at different targeted frequencies, and therefore the disclosure is not limited to the motor vehicle 10 of FIG. 1 and targeted 10-20 Hz corner vibrations.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for controlling a force from a real-time damper in a sprung mass system having a sprung mass, the method comprising:

detecting a periodic frequency and a periodic magnitude of a target periodic vibration of the sprung mass, via a controller, wherein the target periodic vibration has a velocity component and an elasticity component that are 90 degrees out-of-phase with respect to one another;

reshaping an electric drive signal to the real-time damper based on a polarity of the velocity component to thereby produce a composite drive signal; and energizing the real-time damper using the composite drive signal to thereby modify the force from the real-time damper;

wherein reshaping the electric drive signal includes introducing an injected force component comprising at least one of an injected perturbation component and an intermittent drive suppression component onto the electric drive signal based on the periodic frequency and the periodic magnitude of the target periodic vibration, and wherein a projection of the injected force component is 180 degrees out-of-phase with the elasticity component of the target periodic vibration.

2. The method of claim 1, wherein the sprung mass system includes a rotary speed sensor, and wherein detecting the periodic frequency includes receiving at least one of a pulse train signal and compacted information directly or arising from the rotary speed sensor, and then calculating the periodic frequency using the pulse train signal and/or the compacted information.

3. The method of claim 2, wherein the sprung mass includes a frame and a body of a motor vehicle having a road wheel, and the rotary speed sensor is a wheel speed sensor connected to the road wheel.

4. The method of claim 2, wherein the sprung mass system includes a displacement sensor, and wherein detecting the periodic magnitude of the target periodic vibration includes measuring a displacement of the real-time damper over time using the displacement sensor, and then calculating the periodic magnitude using the displacement of the real-time damper as measured by the displacement sensor.

5. The method of claim 2, wherein the sprung mass system includes an accelerometer, and wherein detecting the periodic magnitude of the target periodic vibration includes measuring an acceleration of the real-time damper over time using the accelerometer, and then calculating the periodic magnitude using the acceleration of the real-time damper as measured by the accelerometer.

6. The method of claim 1, the method further comprising: calculating a phase of the target periodic vibration, wherein reshaping the electric drive signal includes estimating a desired drive signal based on the periodic frequency, the phase of the target periodic vibration, and a predetermined dynamic characterization of the real-time damper.

7. The method of claim 6, wherein the controller is programmed with a lookup table containing the predetermined dynamic characterization, the method further comprising: extracting the electric drive signal from the lookup table based on the periodic frequency.

8. The method of claim 1, wherein energizing the real-time damper using the composite drive signal includes generating a magnetic field or an electric field with respect to the real-time damper to thereby modify the force from the real-time damper.

9. The method of claim 1, further comprising selectively disabling the reshaping in response to a predetermined condition.

10. The method of claim 9, wherein the predetermined condition includes receipt of an override signal by the controller.

11. The method of claim 10, the method further comprising: calculating a root mean square (rms) amplitude of a total vibration of the sprung mass system, and automatically generating the override signal via the controller when a calibrated variance exists between the rms amplitude and the periodic magnitude.

12. A sprung mass system comprising:
a frame connected to or integrally formed with a body;
a plurality of motion sensors;
a plurality of wheel speed sensors;
a plurality of real-time dampers each respectively having individually-controlled forces that are responsive to an electric drive signal, and each being disposed with respect to a corresponding corner of the frame and the body, wherein a respective one of the motion sensors is connected to a respective one of the real-time dampers;
a set of road wheels each independently sprung to a respective one of the corners via a respective one of the real-time dampers, wherein each respective one of the road wheels is connected to a respective one of the wheel speed sensors; and
a controller that is electrically connected to the real-time dampers and is in communication with the wheel speed sensors and the motion sensors, wherein the controller is configured to:
detect a periodic frequency and a periodic magnitude of a target periodic vibration of the frame and the body using measurements from the wheel speed sensors and the motion sensors, wherein the target periodic vibration has a velocity component and an elasticity component that are 90 degrees out-of-phase with respect to each other;
reshape the electric drive signal based on a polarity of the velocity component to thereby generate a composite drive signal, including introducing at least one of an injected force component and an intermittent drive suppression component onto the electric drive signal based on the periodic frequency and the periodic magnitude of the target periodic vibration, wherein a projection of the injected force component is 180 degrees out-of-phase with the elasticity component of the target periodic vibration; and
energize the real-time damper using the composite drive signal to thereby individually modify the force from each of the real-time dampers.

13. The sprung mass system of claim 12, wherein the controller is configured to detect the periodic frequency by calculating the periodic frequency using information from a pulse train signal from the wheel speed sensors.

14. The sprung mass system of claim 12, wherein the controller is configured to calculate a phase of the target periodic vibration and generate the composite drive signal based on the periodic frequency, the phase of the target periodic vibration, and a predetermined dynamic characterization of the real-time damper.

15. The sprung mass system of claim 14, wherein the controller is programmed with a lookup table containing the predetermined dynamic characterization, and is configured to extract the electric drive signal from the lookup table based on the periodic frequency.

16. The sprung mass system of claim 12, wherein the real-time damper is a magnetorheological damper.

17. The sprung mass system of claim 12, wherein the real-time damper is an electrorheological damper.

18. The sprung mass system of claim 12, wherein the real-time damper is a hydraulic damper.

19. The sprung mass system of claim 12, wherein the controller is configured to selectively disable reshaping of the electric drive signal in response to an override signal.

20. The sprung mass system of claim 19, wherein the controller is configured to calculate a root mean square amplitude of the total vibration, and to automatically generate the override signal when a calibrated variance exists between the root mean square amplitude and the periodic magnitude.

* * * * *